[19] United States Patent
Bierach et al.

[11] Patent Number: 5,600,683
[45] Date of Patent: Feb. 4, 1997

[54] COMMUNICATION DATA FORMAT

[75] Inventors: Kirk B. Bierach, Saratoga; Ximing Shi, Fremont, both of Calif.

[73] Assignee: Motorola, Inc., Schaumburg, Ill.

[21] Appl. No.: 432,257

[22] Filed: May 1, 1995

[51] Int. Cl.$^6$ ..................................................... H04L 7/00
[52] U.S. Cl. ..................................................... 375/363
[58] Field of Search ............................. 375/284, 285, 375/363, 364, 366, 368; 370/105.1, 105.4, 106

[56] References Cited

U.S. PATENT DOCUMENTS 5,325,088   6/1994   Willard et al. ................ 370/94.1 X
5,382,952   1/1995   Miller ............................ 340/825.54

Primary Examiner—Stephen Chin
Assistant Examiner—Kevin Kim
Attorney, Agent, or Firm—Gary J. Cunningham

[57] ABSTRACT

A new data format used in a communication system employing binary phase shift keying modulation and demodulation is described. The data format provides for a frame comprising a plurality of variable data bits and synchronization bits. The number of variable data bits in the data format of the present invention is more than the number of synchronization bits. The data format preferably includes a CRC field for error detection. In order to uniquely decode the information contained in the frame, the inverse of frame should not be a valid frame. A method for detecting invalid frames is also disclosed.

12 Claims, 3 Drawing Sheets

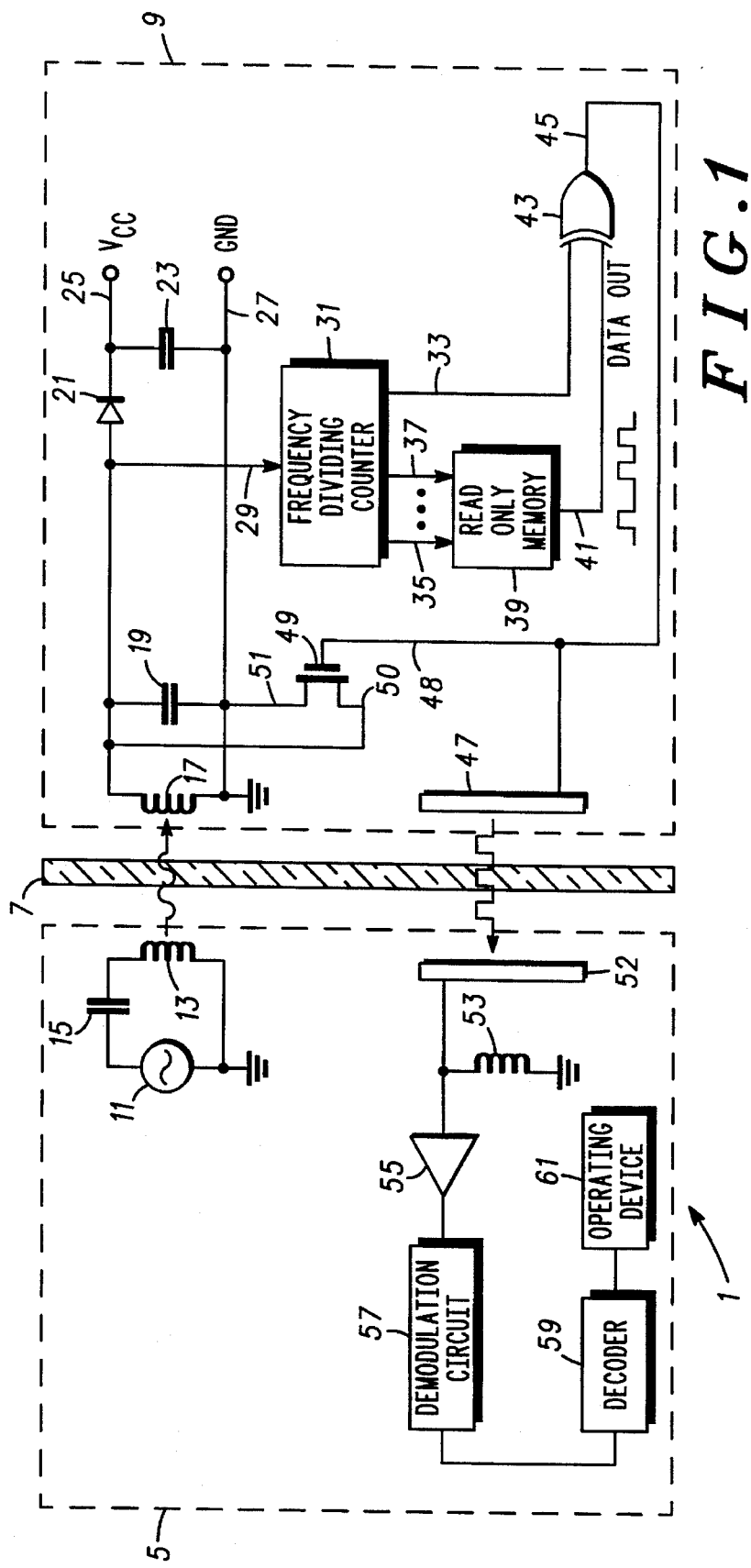

COMMUNICATION DATA FORMAT

BACKGROUND OF THE INVENTION

The present invention relates generally to communication devices, and more particularly, to a data format used by such devices to maximize the amount of information that can be conveyed by the data format.

An example of a communication device is a remotely powered electronic device and related system for powering up and receiving stored information from such device. For example, U.S. Pat. No. 4,818,855, issued to Mongeon et al., entitled, Identification System, discloses a remotely powered identification device which derives power from a remote source via one of an electric field or a magnetic field and which transmits stored information back to the source via the other of the electric field or magnetic field. Similarly, U.S. Pat. No. 5,009,227, issued to Geiszler et al., entitled, Proximity Detecting Apparatus, discloses a remotely powered device which uses electromagnetic coupling to derive power from a remote source and which uses both electromagnetic and electrostatic coupling to transmit stored data back to the source.

An example of a remotely powered electronic device and related system is a proximity identification system. In this system, an interrogator, typically located in a fixed installation, transmits an interrogating signal to activate a portable transponder type device (e.g., a tag). The tag is ordinarily carried by a person, an animal or an object, which is in the vicinity or proximity of the interrogator. The signals from the interrogator causes the transponder to continuously produce and transmit a coded identifying signal to a receiver conventionally located at the same location as the interrogator. The receiver, upon detection of a valid identifying code from the transponder, activates some system functions, e.g., to provide access to a controlled area or to keep track of the person, animal or object.

The identifying code conforms with a predetermined data format so that the receiver can determine its validity. Several formats have been suggested and used. For example, U.S. Pat. No. 5,382,952, issued to Miller and entitled Transponder for Proximity Identification System, discloses a 64-bit data format (i.e., each frame contains 64 bits). This format provides for a 32-bit synchronization field, one start bit, and an optional parity bit. The rest of the bits are variable data bits which can be used to assign distinct identifying codes to different tags. According to Miller, the 32-bit synchronization field is required for correct decoding. This data format is not efficient because less than half the frame can be used to store identifying codes.

The number of distinct identifying codes associated with a data format increases with the number of variable data bits. Specifically, the maximum number of allowable distinct identifying codes is equal to $2^n$, where n is the number of variable data bits. Thus, in order to increase the number of identifying codes, it is desirable to have as many variable data bits as possible.

It should be appreciated that the variable data bits can be used to convey many types of information in addition to identifying codes. Also, the data format can be used in many communication devices in addition to proximity identification systems.

SUMMARY OF THE INVENTION

The invention involves a system comprising a device containing digital data arranged to include a plurality of variable data bits and synchronization bits. The number of variable data bits is more than the number of synchronization bits. The system also contains a modulation circuit coupled to the device for generating a modulated signal by modulating the digital data using a binary phase shift keying modulation technique.

The invention also involves a method for determining whether a data frame is a valid frame. The valid frame contains synchronization bits at a first set of predetermined positions and variable data bits at a second set of predetermined positions. The variable data bits can be used to store user information. The method starts by scanning the data frame to verify that its first set of predetermined positions contains synchronization bits. If the verification is positive, meaning that the synchronization bits are at appropriate positions, the data frame is a valid frame. The variable data bits can be extracted from the second set of predetermined positions. If the first set of predetermined positions in the data frame does not contain the synchronization bits, a complementary frame is formed by inverting all the bits in the data frame. The complementary frame is checked to verify that its first set of predetermined positions contains synchronization bits. If the first set of predetermined positions of the complementary frame indeed contains the synchronization bits, the complementary frame is a valid frame. The variable data bits are extracted from the second set of predetermined positions of the complementary frame. If the first set of predetermined positions of the complementary frame does not contain valid synchronization bits, the data frame and the complementary frame are invalid.

The invention further involves a method for generating a valid frame having synchronization bits at a first set of predetermined positions and variable data bits at a second set of predetermined positions. A test frame is assembled by placing synchronization bits at the first set of predetermined positions and variable data bits at the second set of predetermined positions. A complementary frame is formed by inverting bits in the test frame. If the bits in the first set of predetermined positions of the complementary frame are the same as the synchronization bits, the test frame is not a valid frame because a demodulation circuit would not be able to determine whether the test frame or the complementary frame is the true frame.

These and other features of the present invention will become apparent from the following description when read in conjunction with the drawings and the appended claims.

BRIEF DESCRIPTION OF THE DRAWINGS

FIG. 1 is a block circuit diagram of a proximity identification system in accordance with the present invention.

FIG. 2 shows a data format of the present invention.

DETAILED DESCRIPTION OF THE PREFERRED EMBODIMENT

Figure 3:
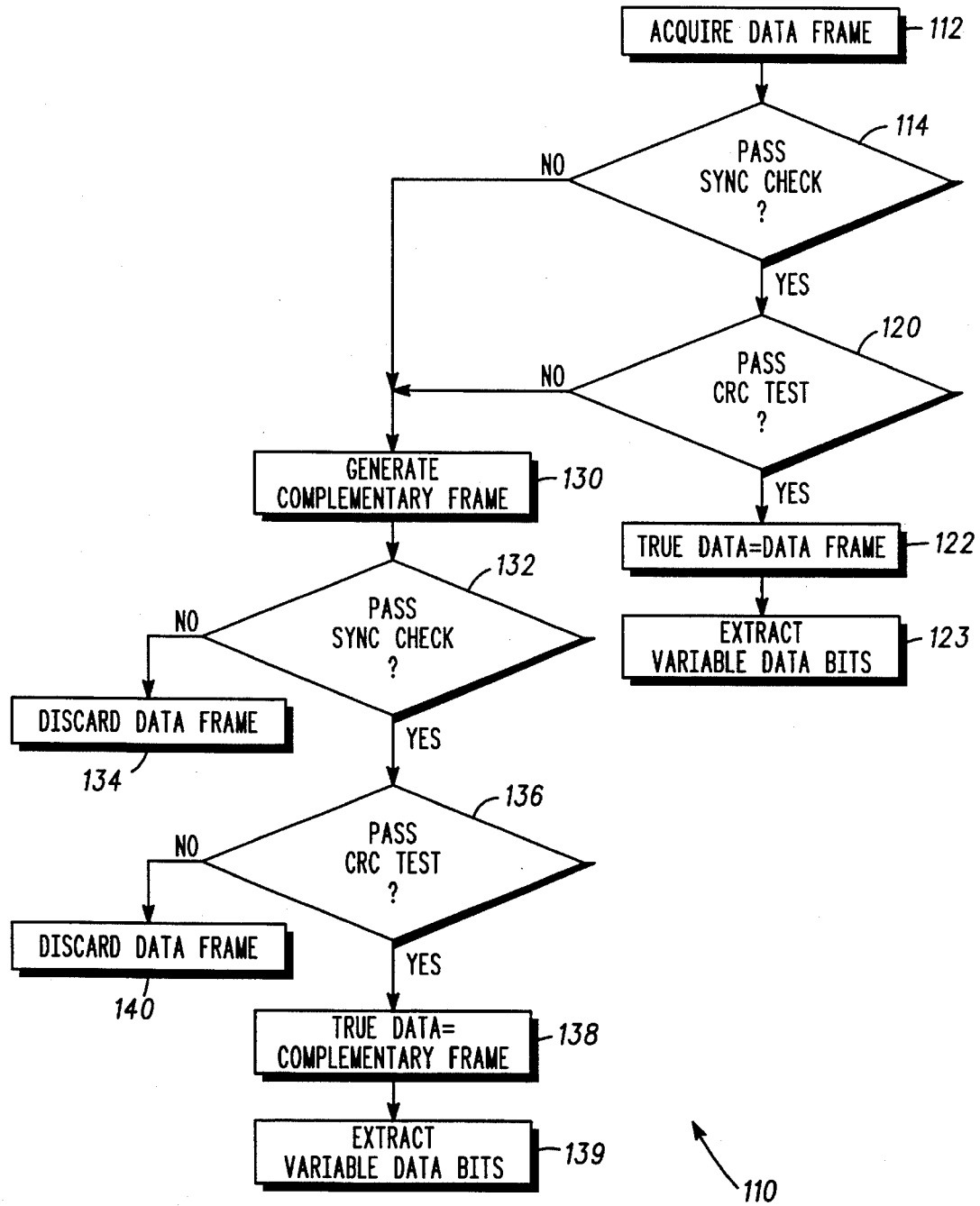
FIG. 3 is a flow chart showing the steps to decode a frame in accordance with the present invention.

The present invention comprises a novel data format typically used in a remotely powered communication device and an associated exciter/reader system. This data format can also be used in other types of communication devices. The following description is presented to enable any person skilled in the art to make and use the invention. Descriptions of specific applications are provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Referring now to FIG. 1, there is shown a proximity identification system 1 wherein reference numeral 5 designates the circuitry of the interrogator and receiver disposed at a fixed installation, for example mounted on a convenient structure 7, such as a wall, a window, a floor or on the ground, etc. The remainder of the circuitry shown in FIG. 1 is contained in a portable transponder type unit 9, e.g. a card or tag, which, for example, is disposed on a person, animal, vehicle, etc. so that it can be brought into proximity of the interrogator/reader 5 for detection.

The exciter or interrogator circuit, which likewise functions as a power supply, consists of an oscillator 11, which puts out power at a convenient frequency $f_0$, e.g. 400 or 125 kHz, and which is connected to a transmit coil antenna 13 tuned to resonate at the output frequency of oscillator 11 by means of a capacitor 15. Coil 13 emits a strong electromagnetic field and is optionally provided with a Faraday shield to avoid capacitive or electrostatic coupling to the receiver portion of the transponder unit 9.

The transponder unit or tag 9 includes a receive antenna or coil 17 and a parallel connected capacitor 19 which form a tuned LC circuit which is resonant at the frequency $f_0$ of the oscillator 11. A half wave rectifier circuit 21 and a filter capacitor 23, which are connected to antenna coil 17 and capacitor 19, provide power for the remaining circuitry of the tag 9 through lines 25 and 27, the connections of which are not shown for simplicity. The high side of the receiving coil antenna 17 is connected via a line 29 to the input of a frequency dividing counter 31 as a clock signal $f_0$. The frequency dividing counter 31 produces an R.F. signal of frequency $f_0/2$ on line 33 and address signals on a plurality of memory select lines, only two of which have been shown at 35 and 37, for activating a read only memory (ROM) 39, which provides a coded identifying signal comprised of a plurality of binary pulses on an output line 41. The counter 31 will continuously read out the content of the ROM 39 so long as the continuous interrogator signal produced by the exciter or interrogator circuit 11, 13, 15 is being received. Lines 33 and 41 are connected to respective inputs of an exclusive OR-gate 43 which produces output pulses on a line 45 which are fed to an electrostatic or electric field antenna 47 which may, for example, be a capacitor plate but preferably is a length of wire. The coded pulses on line 41 occur at a much lower rate than the signal of frequency $f_0/2$ on line 33. The effect of exclusive OR-gate 43 is to bi-phase modulate the signal on line 33, which serves as a carrier frequency signal, with the coded pulse train on line 41, as described in greater detail in U.S. Pat. No. 4,818,855, the subject matter of which is incorporated herein by reference. The circuit arrangement involving XOR-gate operating on a carrier frequency signal and a coded pulse train comprises a binary phase shift keying modulation circuit.

In the illustrated embodiment the line 45 is likewise connected to the gate 48 of an MOS transistor 49, for example an N channel enhancement mode transistor, having its drain 50 connected to the high side of coil 17 and its source 51 connected to ground. With this arrangement, the coded data on line 45 is simultaneously coupled to the receiving antenna coil 17 which then likewise acts as an electromagnetic transmitting coil or antenna.

The signals on line 45 fed to the electrostatic or electric field antenna 47 and to the antenna or coil 17 are picked up respectively at the interrogator/reader 5 by a receiving electrostatic antenna 52, and a receiving electromagnetic antenna or coil 53, which are connected to, the input of a common preamplifier circuit 55. The output signals from the preamplifier 55 are detected by a demodulation circuit 57 and passed to a decoder 59 for validation. Demodulation circuit 57 and decoder 59 recover the data stored in ROM 39 (which have been modulated by gate 43). When an correct coded signal has been detected, an operating device 61 is then triggered. Operating device 61 might take many forms, such as a security device for admitting one to a secure area, a device for recording the location of the person or object carrying the tag, and the like. It should be noted, however, that although the transponder 5 of the illustrated system utilizes both electromagnetic coupling and electrostatic coupling for simultaneous transmission of an encoded identification signal to the reader portion of the interrogator/reader 5, such is not required. That is, if desired only electrostatic coupling or only electromagnetic coupling may be utilized in a known manner.

In the proximity identification system 1 of FIG. 1, the modulation technique used is binary phase shift keying (BPSK), which is well known in the art. This modulation technique can be easily implemented and is reasonably resistant to noise. Under BPSK, a 180 degree phase shift in the carrier corresponds to a data state change, i.e., from a logic 1 to a logic 0, or from a logic 0 to a logic 1. The phase shift does not, by itself, indicate the absolute value of the data state. Thus, it is not possible to determine whether a demodulated data should be in a true state (i.e., the state of the data in ROM 39) or a complementary state (i.e., the inverse of the true state) without additional information. A method for determining the true state of an identifying code in accordance with the present invention will be described below.

FIG. 2 shows a preferred data format of the identifying code used in proximity identification system 1 of the present invention. It should be appreciated that other data format may also be used. Each identifying code is encoded in a frame 80 having 64 bits. Frame 80 contains 17 bits having fixed values: seven distributed synchronization ("sync") bits having a fixed logic of "0" (designated in FIG. 2 by reference numeral 82) and a sync field of 10 bits having a fixed logic of "1" (designated in FIG. 2 by reference numeral 84). Frame 80 contains 42 bits of variable data preferably separated into three fields designated by letters "a", "b" and "s". Finally, frame 80 contains a field of 5 bits for storing a cyclic redundancy check (CRC) value performed over all the variable data bits (i.e., "a", "b" and "s"). The algorithm for computing CRC is well known in the art, and will not be described here.

It can be seen from FIG. 2 that more than half the bits in frame 80 are variable data bits. Thus, the amount of information contained in frame 80 is more than the prior art data format.

The fields labelled "a" and "b" are preferably used as a lower ID field and a upper ID field, respectively, for a tag. The lower ID field could be assigned sequentially. The upper ID field could be sub-divided into additional sub-fields. For example, the upper ID field having values over 10,000 could be set aside for applications that do not require "classes" of products, but simply require a unique ID for each tagged object. The upper ID field having values between 0 and 9,999 could be used by customers that require an ID and an object class (e.g., upper ID of 300 for mops, 301 for pallets, etc.).

In some applications, it is desirable to be able to identify the types of devices used in a system. In these applications, the two bits designated by the letter "s" is preferably used as a signature for such identification. In this case, these two bits will not be available for use as variable data.

It should be appreciated that dividing the variable data bits into fields and sub-fields is optional. For example, it is possible to assign all the variable data bits to just one field.

In the data format of the present invention, a valid frame must meet the following conditions: (a) the distributed sync bits are logic "0" and located at designated positions, (b) the sync field contains 10 contiguous bits of value "1" and (c) the value in the CRC field of the frame must match the CRC value of the variable data bits in the frame. In the majority of frames, the complement of a valid frame (i.e., setting all the bits in the frame to their inverse) would not meet the above described conditions. Thus, it is easy to determine the true state of the demodulated signal. A method for the determination is shown in FIG. 3.

FIG. 3 is a flow chart 110 showing the steps to decode a frame (i.e., determining its true value) in accordance with the present invention. These steps are carried out by decoder 59 of FIG. 1. In step 112, a data frame is acquired by assembling 64 bits of contiguous data received from demodulation circuit 57. In step 114, the frame is scanned to verify the location and value of the distributed sync bits and the 10 bit sync field (the "sync check"). If the sync check is passed, the CRC of the variable data bits is performed and compared with the value of the CRC field in the data frame (the "CRC" test, step 120). If the "CRC" test is passed, the data frame is considered valid and the true data is contained in the data frame (step 122). In step 123, the variable data bits can be extracted from the data frame.

If either the CRC test in step 120 or the sync check in step 114 is not passed, the bits in the frame are inverted to generate a complementary frame (step 130). In step 132, a sync check is performed on the complementary frame. If the sync check is not passed, the data frame is discarded because it is either corrupted or has a different data format (step 134). If the sync check is passed, a CRC test is performed (step 136). If the CRC test is passed, the complementary frame is a valid frame and the data contained therein is the true data (step 138). In step 139, the variable data bits can be extracted from the complementary data frame. If the CRC test is not passed, the complementary frame is discarded because the data is corrupted (step 140).

If the data frame and complementary frame are found to be invalid, decoder 59 then acquires a new frame and performs the steps in flow chart 110 in order to find a valid frame. One way to acquire a new frame is to shift the data frame one bit using the 65th bit received from demodulation circuit 57.

As pointed out above, the receiver circuit in interrogator 5 of FIG. 1 continuously demodulate signals transmitted by tag 9. Thus, it is possible to assembly a plurality of 64-bit frames based on a stream of demodulated signals. In one embodiment of the invention, these frames are compared. If the frames do not match, they are discarded because the mismatch indicates an error in the received data. The steps in flow chart 110 are performed only when the frames match. In another embodiment of the invention, several data frames are assembled in step 112 using contiguous data obtained from demodulation circuit 57. All the data frames go through the steps in flow chart 110 at the same time. The data frames are discarded in steps 134 and 140 when any one of these data frames does not pass the appropriate tests. The above described procedures (called "multi-compare") reduce the probably of error.

The data frame which contains the identifying code of tag 9 (i.e., a "tag value") is preferably burnt into ROM 39 during the manufacturing of tag 9. Precautions need to be taken in the assignment of identifying codes and creation of data frames. This is because there is a possibility that a data frame could pass the sync check and CRC test in both the true and complementary states (a "dual valid frame"). As pointed out above, the demodulation signals could be the inverse of the true data. Under the steps described in flow chart 110, it is possible for decoder 59 to accept a complementary frame as a valid frame because the complementary frame passes the tests in steps 114 and 120. In this case, the identifying code decoded by decoder 59 could be the inverse of the true identifying code. Thus, it is important to exclude dual valid frames from being used in system 1.

Figure 4:
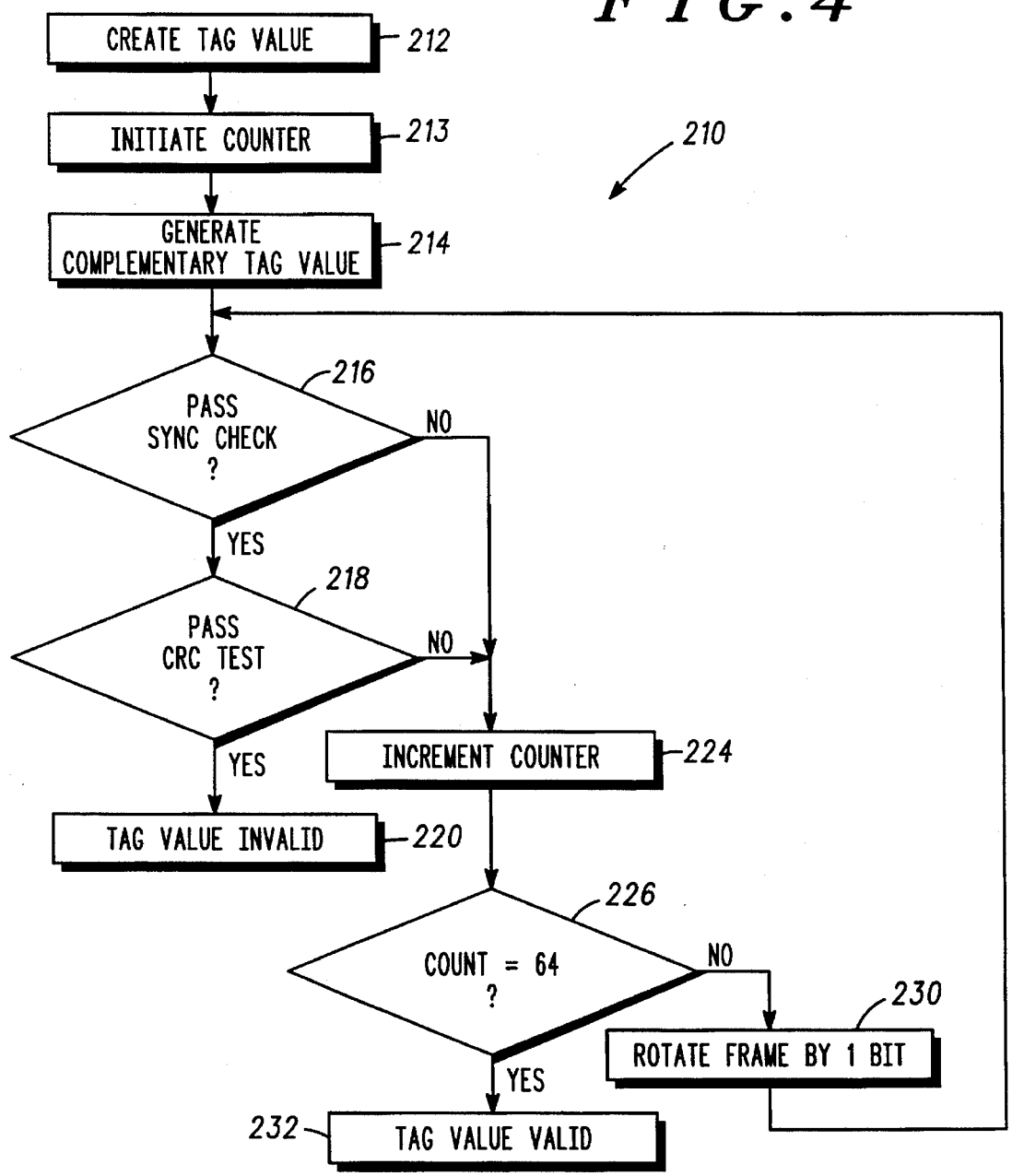
FIG. 4 is a flow chart showing the steps to determine whether a frame is a valid frame in accordance with the present invention.

The tag values are preferably generated and tested using a computer prior to the manufacturing of tags. FIG. 4 is a flow chart 210 showing the steps for determining whether a tag value to be tested is a dual valid frame. In step 212, a tag value is created by assembling variable data bits (i.e., the identifying code), sync bits, and CRC bits at the appropriate positions. In step 213, a counter is initialized to zero. In step 214, a complementary tag value is created. In step 216, a sync check is performed on the complementary tag value (or on a rotated frame, as explained below in connection with step 230). If the complementary tag value (or the rotated frame) passes the sync check, a CRC test is performed (step 218). If the CRC test is passed, this tag value is not valid and should be discarded (step 220). Flow chart 210 then terminates.

Even when the complementary frame (or the rotated frame) does not pass the sync check and CRC test, the tag value could still be a dual valid frame. As pointed out above, data is continuously being generated by demodulation circuit 57 and data frames are assembled by decoder 59. Thus, it is possible that the starting point of a frame operated on by decoder 59 is rotated by one or more bits from the beginning of the actual frame. Consequently, it is important that tag values be discarded when any of their rotations is a dual valid frame. In order to prevent decoder 59 from treating a rotated frame as a valid frame, steps 216 and 218 are performed on frames which are rotations of the original complementary tag value. In step 224, the counter is incremented by one. In step 226, the value of the counter is compared to 64. If the value of the counter is not equal to 64, a one-bit rotation of the current frame is performed (step 230). This rotated frame is then subject to the sync check and CRC test in steps 216 and 218, respectively. If the value of the counter is equal to 64, the tag value created in step 212 is a valid tag value (step 232).

The decoding method of the present invention uses multi-compare, CRC, and sync bits to detect an invalid frame. It is possible to estimate the probability that a "bad" frame can slip through the above tests. The probability of a bit error occurring in a certain bit position in successive frames, thereby creating a "bad" frame that meets multi-compare criteria is:

$Pm=(1/64)^n$; where n is the number of compares.

The probability of a "bad" frame slipping through a CRC test is:

$Pc=(1/25)^n$; where n is the number of compares.

The probability of a "bad" frame slipping through a sync test is (assuming that the "s" field is fixed, and can be considered as additional sync bits):

$Ps=(45/64)^n$; where n is the number of compares.

The total probability is the product of Pm, Pc, and Ps. For n=1, the probability is 1 in over 8 million. For n=2, the probability is 1 in over 24 billion. For n=3, the probability is 1 in over 71 trillion. Thus, the probability of error is extremely small.

The data format of the present invention is not limited to the frame structure shown in FIG. 2. It is possible to change the number of sync bits. For example, reducing the number of sync bits allows more bits to be used to store variable data. However, as the number of sync bit decreases, the number of dual valid frames increases. Thus, the total number of distinct valid frames does not necessarily increase with the number of variable data bits. The structure of frame 80 represents a best compromise envisioned by the inventor.

It is also possible to change the number of CRC bits. For example, reducing the number of CRC bits increases the number of variable data bits. However, the ability to detect errors decreases when the number of CRC bits decreases. Again, the structure of frame 80 represents a best compromise envisioned by the inventor.

One advantage of the present data format over the prior art data format is that the number of variable data bits can be more than half the total number of bits in a frame. As a result, the amount of information conveyed by the present data format is more than the prior art data format. Another advantage is that the present data format supports decoding methods which reduce the probability of error.

The invention now being fully described, it will be apparent to one of ordinary skill in the art that any changes and modifications can be made thereto without departing from the spirit or scope of the invention as set forth herein. Accordingly, the present invention is to be limited solely by the scope of the appended claims.

What is claimed is:

1. A system comprising:

a device containing digital data arranged to include a plurality of variable data bits and synchronization bits, the number of said variable data bits being more than the number of said synchronization bits; and a modulation circuit coupled to said device for generating modulated signals by modulating said digital data in accordance with a binary phase shift keying technique;

a demodulation circuit for generating demodulated signals from said modulated signals;

a decoder for correctly recovering said variable data bits from said demodulated signals, said decoder includes;

means for verifying that said demodulated signals contain said synchronization bits;

means for forming a complement of said demodulated signals; and means for extracting said variable data bits.

2. The digital data of claim 1 further including a CRC field.

3. The digital data of claim 1 wherein said synchronization bits include a plurality of distributed synchronization bits and a fixed synchronization field having a plurality of contiguous synchronization bits.

4. The system of claim 1 wherein said variable data bits are arranged into a plurality of fields.

5. A method for determining whether a data frame is a valid frame, said valid frame having synchronization bits at a first set of predetermined positions and variable data bits at a second set of predetermined positions, comprising the steps of:

scanning said first set of predetermined positions of said data frame;

if said first set of predetermined positions contains said synchronization bits, extracting said variable data bits located at said second set of predetermined positions;

if said first set of predetermined positions does not contain said synchronization bits:

forming a complementary frame by inverting all bits in said data frame;

scanning said first set of predetermined positions of said complementary frame;

if said first set of predetermined positions of said complementary frame contains said synchronization bits, extracting said variable data bits located at said second set of predetermined positions of said complementary frame; and if said first set of predetermined positions of said complementary frame does not contain said synchronization bits, discarding said data frame.

6. The method of claim 5 wherein said valid frame further includes a third set of predetermined positions for storing a CRC value, said method further comprising:

computing a first CRC value for said variable data bits at said data frame; and extracting said variable data bits located at said second set of predetermined positions of said data frame if said first CRC value is equal to said CRC value at said third set of predetermined positions.

7. The method of claim 6 further comprising the steps of:

computing a second CRC value for bits in said complementary frame located in said second set of predetermined positions; and discarding said data frame if said second CRC value is different from a CRC value designated by said third set of predetermined positions of said complementary frame.

8. The method of claim 5 further comprises:

assembling a plurality of data frames;

comparing bits in corresponding positions in said plurality of data frames; and discarding said plurality of data frames if said comparing step indicates that one or more corresponding bits in said plurality of data frames are not the same.

9. The method of claim 5 wherein said variable data bits are divided into a plurality of fields.

10. A method for generating a valid frame having synchronization bits at a first set of predetermined positions and variable data bits at a second set of predetermined positions, comprising the steps of:

assembling a test frame by placing synchronization bits at said first set of predetermined positions and variable data bits at said second set of predetermined positions;

forming a complementary frame by inverting bits in said test frame; and discarding said test frame if the bits in said first set of predetermined positions of said complementary frame are the same as said synchronization bits.

11. The method of claim 10 further comprising the steps of rotating said test frame one bit at a time; and at each rotation, performing the following steps:

forming a complementary rotated frame by inverting bits in said rotated frame; and discarding said test frame if the bits in said first set of predetermined positions of said complementary rotated frame are the same as said synchronization bits.

12. The method of claim 10 wherein said variable data bits are arranged into a plurality of fields.

* * * * *